(12) United States Patent
Umezawa et al.

(10) Patent No.: US 9,170,103 B2
(45) Date of Patent: Oct. 27, 2015

(54) STEREO CAMERA DEVICE, CORRECTION METHOD, AND PROGRAM

(75) Inventors: Yuko Umezawa, Tokyo (JP); Shin Aoki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 420 days.

(21) Appl. No.: 13/508,900

(22) PCT Filed: Sep. 5, 2011

(86) PCT No.: PCT/JP2011/070661
§ 371 (c)(1),
(2), (4) Date: May 9, 2012

(87) PCT Pub. No.: WO2012/036102
PCT Pub. Date: Mar. 22, 2012

(65) Prior Publication Data
US 2012/0236125 A1 Sep. 20, 2012

(30) Foreign Application Priority Data
Sep. 14, 2010 (JP) .................................. 2010-205015
May 31, 2011 (JP) .................................. 2011-121378

(51) Int. Cl.
*H04N 7/18* (2006.01)
*G01B 11/14* (2006.01)
(Continued)

(52) U.S. Cl.
CPC ................ *G01C 3/085* (2013.01); *G01S 11/12* (2013.01); *G06T 7/0075* (2013.01); *G06T 2207/10021* (2013.01); *G06T 2207/20076* (2013.01); *G06T 2207/30256* (2013.01); *H04N 7/18* (2013.01)

(58) Field of Classification Search
CPC ..... H04N 13/02; H04N 13/0066; H04N 7/18; G06K 9/00; G01C 3/06

USPC ....................... 348/47, 42, 142, 135; 382/154
See application file for complete search history.

(56) References Cited

U.S. PATENT DOCUMENTS 5,418,899 A 5/1995 Aoki
5,436,739 A 7/1995 Imao
(Continued)

FOREIGN PATENT DOCUMENTS

JP 8-75454 A 3/1996
JP 09133525 A * 5/1997 ............... G01C 3/06
(Continued)

OTHER PUBLICATIONS

Korean Office Action issued Feb. 17, 2014 in Patent Application No. 10-2012-7011785.
(Continued)

*Primary Examiner* — Jorge L Ortiz Criado
*Assistant Examiner* — Albert Kir
(74) *Attorney, Agent, or Firm* — Oblon, McClelland, Maier & Neustadt, L.L.P.

(57) ABSTRACT

A stereo camera device detecting a distance to a subject includes two cameras and a calculation unit that calculates a distance to the subject based on the images acquired by the two cameras. The calculation unit includes an image processing unit that searches for corresponding points of the images acquired by the two cameras and calculates two parallaxes based on differences in positional coordinates of the corresponding points on the images, an offset value calculation unit that calculates parallax offset values across the images based on the two parallaxes calculated by the image processing unit at least at two time points, and a statistical processing unit that performs a statistical analysis on a distribution of the parallax offset values and determines an optimum value of the parallax offset values, the optimum value being used as a correction parameter.

12 Claims, 7 Drawing Sheets

(51) Int. Cl.
*G01C 3/08* (2006.01)
*G01S 11/12* (2006.01)
*G06T 7/00* (2006.01)

(56) References Cited

U.S. PATENT DOCUMENTS

| | | | |
|---|---|---|---|
| 5,541,742 | A | 7/1996 | Imao |
| 5,659,406 | A | 8/1997 | Imao |
| 6,628,327 | B1 | 9/2003 | Aoki |
| 6,628,427 | B1 | 9/2003 | Aoki |
| 6,856,708 | B1 | 2/2005 | Aoki |
| 6,882,365 | B1 | 4/2005 | Aoki |
| 6,947,076 | B1 | 9/2005 | Kitaguchi |
| 7,145,596 | B2 | 12/2006 | Kitaguchi |
| 7,182,464 | B2 | 2/2007 | Ejiri |
| 7,379,621 | B2 | 5/2008 | Aoki |
| 7,428,007 | B2 | 9/2008 | Kitaguchi |
| 7,595,826 | B2 | 9/2009 | Aoki |
| 2009/0046924 | A1* | 2/2009 | Morimitsu .................. 382/154 |
| 2009/0190827 | A1 | 7/2009 | Saito |
| 2009/0271111 | A1 | 10/2009 | Takanashi et al. |
| 2010/0283837 | A1 | 11/2010 | Oohchida |
| 2011/0001814 | A1 | 1/2011 | Yamanaka |
| 2011/0096185 | A1 | 4/2011 | Aoki |
| 2011/0134282 | A1 | 6/2011 | Morita |
| 2011/0216215 | A1 | 9/2011 | Maruyama |
| 2014/0002593 | A1* | 1/2014 | Zhang et al. .................. 348/42 |

FOREIGN PATENT DOCUMENTS

| | | |
|---|---|---|
| JP | 10-232111 A | 9/1998 |
| JP | 10 341458 | 12/1998 |
| JP | 2004 28811 | 1/2004 |
| JP | 2009 8539 | 1/2009 |
| JP | 2009 75124 | 4/2009 |
| JP | 2009 176090 | 8/2009 |
| JP | 2009 288233 | 12/2009 |

OTHER PUBLICATIONS

International Search Report Issued Dec. 6, 2011 in PCT/JP11/70661 Filed Sep. 5, 2011.

* cited by examiner

$\triangle AO_R O_L \backsim \triangle O_L P'_R P_L$ $d = B/p \times f = B \times f/p$

STEREO CAMERA DEVICE, CORRECTION METHOD, AND PROGRAM

TECHNICAL FIELD

The present invention relates to a measurement technique of measuring a distance to a subject using images, and more particularly to a stereo camera, a correction method, and a program that effectively collects a parameter.

BACKGROUND ART

There has been known a so-called stereo camera device that measures a distance between a formed image and a subject by disposing plural imaging devices such as cameras for forming an image of a subject. A parallel stereo camera includes two cameras fixed at different positions. A parallel stereo camera device includes two fixed cameras separated from each other by a predetermined distance which is referred to as a base line length. Those two cameras are fixed in a manner such that the optical axes of the cameras are parallel to each other. The stereo camera device is provided to determine the distance to the subject by converting the parallax between a subject image acquired by the first camera and a subject image acquired by the second camera into the distance using a specific parameter in an optical system.

Figure 7:
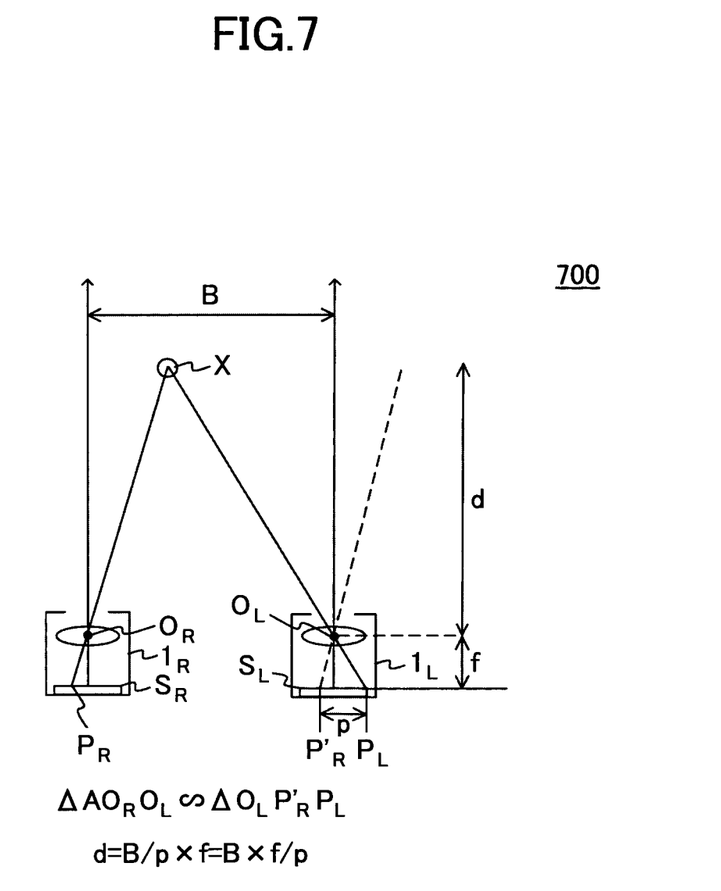
FIG. 7 is a drawing illustrating an optical relationship for distance measurement using a stereo camera device.

FIG. 7 illustrates an optical system of a conventional stereo camera device. As illustrated in FIG. 7, the stereo camera device 700 includes two cameras $1_R$ and $1_L$. Those two cameras $1_R$ and $1_L$ are disposed so as to be separated from each other by a predetermined base line length B. Those cameras $1_R$ and $1_L$ include respective image sensors (imaging devices) and imaging lenses (imaging optical systems). The image sensors (imaging devices) are made of a CCD (Charge Coupled Device) or CMOS (Complementary Metal Oxide Semiconductor) sensor or the like. The imaging lenses (imaging optical systems) are provided for forming an image of the subject in an imaging field on an imaging surface of the image sensors (imaging devices).

A method of measuring the distance using two cameras disposed in parallel is described with reference to FIG. 7. In the stereo camera device 700 of FIG. 7, it is assumed that the camera $1_R$ having a focal point distance f, an optical center $O_R$, and an imaging surface $S_R$ is disposed in a manner such that the optical axis of the camera $1_R$ extends in the direction parallel to the vertical direction of the sheet of FIG. 7, and that the camera $1_L$ having the same focal point distance f, an optical center $O_L$, and an imaging surface $S_L$ is disposed in a manner such that the camera $1_L$ is in parallel to the camera $1_R$ and is separated from the camera $1_R$ by a distance B. By having this configuration, an image of a subject X which is separated from the optical center $O_R$ of the camera $1_R$ by a distance d in the optical axis direction is formed at a position $P_R$ on the imaging surface $S_R$ of the camera $1_R$, the position $P_R$ being the cross point between the straight line passing through the X and optical center $O_R$ (hereinafter referred to as a straight line X-$O_R$).

On the other hand, in the camera $1_L$, the image of the subject X is formed at a position $P_L$ on the imaging surface $S_L$ of the camera $1_L$. Further, a straight line passing through the optical center $O_L$ of the camera $1_L$ and being parallel to the straight line X-$O_R$ is expressed in a dotted line as illustrated in FIG. 7. Further, the cross point between the dotted line and the imaging surface $S_L$ is expressed as a position $P_R'$ and the distance between the position $P_L$ and the position $P_R'$ is expressed as a distance p. In this case, the position $P_R'$ in the camera $1_L$ corresponds to the position $P_R$ in the camera $1_R$, and the distance p denotes a positional shifted amount of the same subject X on the imaging surfaces of the two cameras. When the distance p is defined as the parallax, since the triangle: X-$O_R$-$O_L$ is similar to the triangle: $O_L$-$P_R'$-$P_L$, the distance d from the optical center to the subject X is obtained based on the distance p by using a formula: d=B×f/p provided that the base line length B and the focal point distance f are known.

In many cases, the stereo camera devices are installed in a moving body such as a vehicle and used for measuring a distance. Due to this usage, the stereo camera devices are subjected to continuous vibrations and temperature changes. As described with reference to FIG. 7, in order to correctly measure (calculate) the distance, it is assumed that the optical axes of the two cameras in the parallel stereo camera device are parallel to each other. Therefore, when the parallelism of the optical axes is out of alignment (i.e., the optical axis of one camera rotates relative to the optical axis of the other camera, so that the optical axes are not parallel to each other), a positional misalignment of the imaging sensor in the lateral direction relative to the optical centers may displace (shift) the position where the image of the subject is to be formed in the parallax direction. Such misalignment of the optical system may cause a serious error in the distance measurement. This error is known as a "parallax offset". As described with reference to FIG. 7, the parallax offset directly influences the parallax and degrades the accuracy of the distance measurement.

To prevent the degradation of the accuracy of the distance measurement, it is necessary to accurately adjust a parameter in the manufacturing process. However, due to vibrations during moving of the vehicle and time-dependent changes in the distortion of the vehicle body, temperature change and the like, the misalignment may occur. To overcome the misalignment, namely in order to maintain the accuracy of the positional relationship between the two cameras in the stereo camera device, there may be one method of adjusting (correcting) the device by using a test chart which is an image having a known distance from the device after the shipment (sales) of the stereo camera device. However, during the adjustment (correction) using the test chart, the stereo camera device may not be used. Namely, when this method is used, availability of the stereo camera device may be greatly reduced.

To overcome the inconvenience of the method, there have been proposed several methods in which the adjustment (correction) is made by using a subject in a scene while moving without using the test chart, the subject having a known feature (e.g., a white lane having a known distance, a traffic signal, and a utility pole). For example, Japanese Patent Application Publication No. 10-341458 (Patent Document 1) discloses a technique in which, to detect the misalignment of the stereo camera device in the installation direction, the figures of static subjects are memorized first and a static subject is recognized by comparing the memorized data. Then, the parallax offset is calculated based on the moved distance measured by a velocity sensor or the like and the distance to the recognized static subject. Further, Japanese Patent No. 3436074 (Patent Document 2) discloses an in-vehicle stereo camera device that performs a correction process based on images of the same static subjects disposed at plural positions and distances between the plural positions. Further, Japanese Patent Application Publication No. 2009-176090 (Patent Document 3) describes an environment recognition device that detects a subject based on an imaged image and determines a surrounding environment. Further, Japanese Patent Application Publication No. 2009-288233

(Patent Document 4) describes a technique of correcting the tilt of an image imaged by a camera.

DISCLOSURE OF THE INVENTION

Problems to be Solved by the Invention

However, in the techniques described above, only limited subjects such as a white lane having a known distance on a highway road, the traffic signal, the utility poles and the like can be recognized. Therefore, the place where and the timing when the parallax offset can be performed may be limited. Further, the scene continuously changes during moving and vision also changes depending on the position of the subject in the image due to lens distortion. Therefore, it may be difficult to precisely recognize the static subject. Further, the method can be used for only the static subjects having the figures which have been memorized.

The present invention is made in light of the above inconveniences of the techniques of the related art as described above, and may provide a stereo camera device, a correction method, and a program that accurately correct the parallax offset by fully using the functions of the stereo camera device regardless of the figure of the subject, timing, place, and regardless of whether the subject is moving.

Means for Solving the Problems

According to an embodiment of the present invention, a stereo camera device includes two cameras and a calculation section. The two cameras are installed in a manner such that the two cameras are separated from each other by a (predetermined) base line length. The calculation section includes an image processing section, an offset value calculation section, a statistical processing section, and a distance calculation section.

The image processing section searches for corresponding points between the images acquired by the two cameras, calculates the parallaxes, and outputs the calculated parallaxes of the respective corresponding points to the offset value calculation section. The offset value calculation section calculates the parallax offset values of the respective corresponding points (1-N). The parallax offset values are the offset values to correct the respective parallaxes of the corresponding points. The parallax offset values are calculated by using the parallaxes at different timings $t_0$ and $t_1$ and the moved distance of the vehicle or the like on which the stereo camera device is mounted without using the distance Z to the subject.

The calculated parallax offset values is output to the statistical processing section. The calculation results of the offset value calculation section are converted into appearance frequency of the parallax offset values. A statistical analysis is performed on the appearance frequency so that an optimum value of the parallax offset value to be used as a correction parameter is determined.

The distance calculation section calculates a distance to a subject to be measured in an parallax image based on the base line length, the focal point distance of the cameras, and the correction parameter determined by the statistical processing section.

Further, the stereo camera device according to an embodiment of the present invention may include a correction section that revises (corrects) the correction parameter based on the optimum value of the parallax offset value. The correction parameter is used for measuring the distance. The correction section in the embodiment may be a motor stage or an NVRAM (Non Volatile Random Access Memory).

Further, according to embodiments of the present invention, there are provided a correction method and a program that cause the calculation section to acquire a correction parameter q so as to be used for the later distance calculation.

DESCRIPTION OF THE REFERENCE NUMERALS

100: STEREO CAMERA DEVICE
102: CAMERA
102a: LENS
102b: PHOTOELECTRIC CONVERSION ELEMENT
104: CAMERA
106: POSITION
108: SUBJECT
110: OPTICAL AXIS
120: CALCULATION SECTION
200: FUNCTIONAL BLOCK
202: IMAGE PROCESSING SECTION
204: VELOCITY SENSOR
206: OFFSET VALUE CALCULATION SECTION
208: DISTANCE CALCULATION SECTION
210: INTERFACE
230: EXTERNAL DEVICE
234: NVRAM
240: STATISTICAL PROCESSING SECTION

BEST MODE FOR CARRYING OUT THE INVENTION

Figure 1:
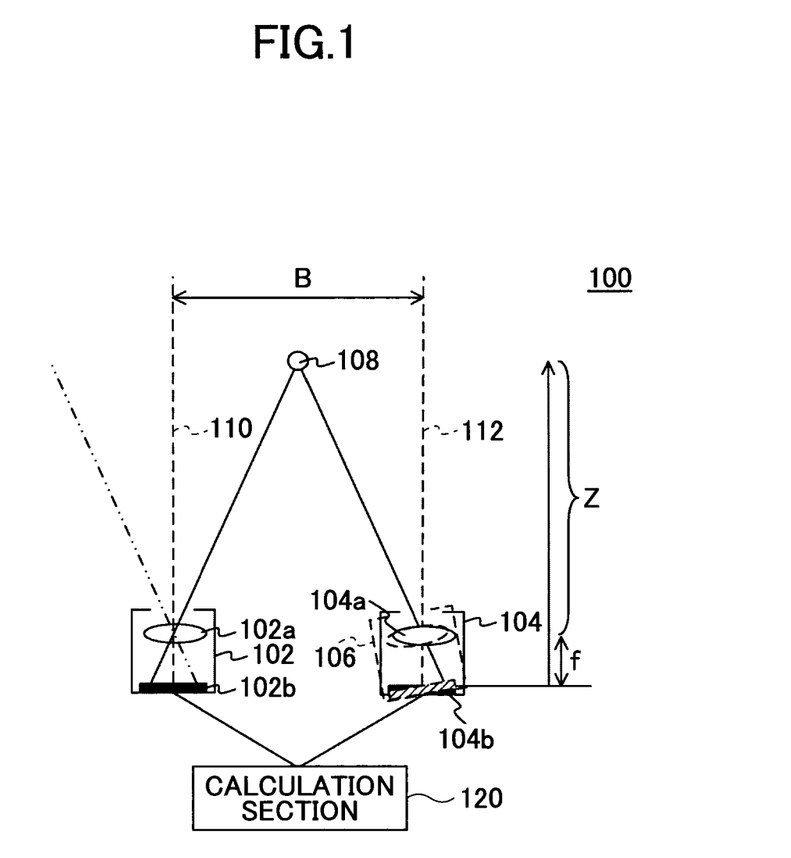
FIG. 1 is a schematic drawing illustrating a configuration of a stereo camera device 100 according to an embodiment of the present invention.

In the following, embodiments of the present invention are described with reference to the accompanying drawings. However, the present invention is not limited to the embodiments. FIG. 1 schematically illustrates a configuration of a stereo camera device 100 according to an embodiment of the present invention. As illustrated in FIG. 1, the stereo camera device 100 includes two cameras 102 and 104 and a calculation section 120. The cameras 102 and 104 outputs digital data. Namely, the cameras 102 and 104 outputs respective captured (acquired) images to the calculation section 120.

Figure 2:
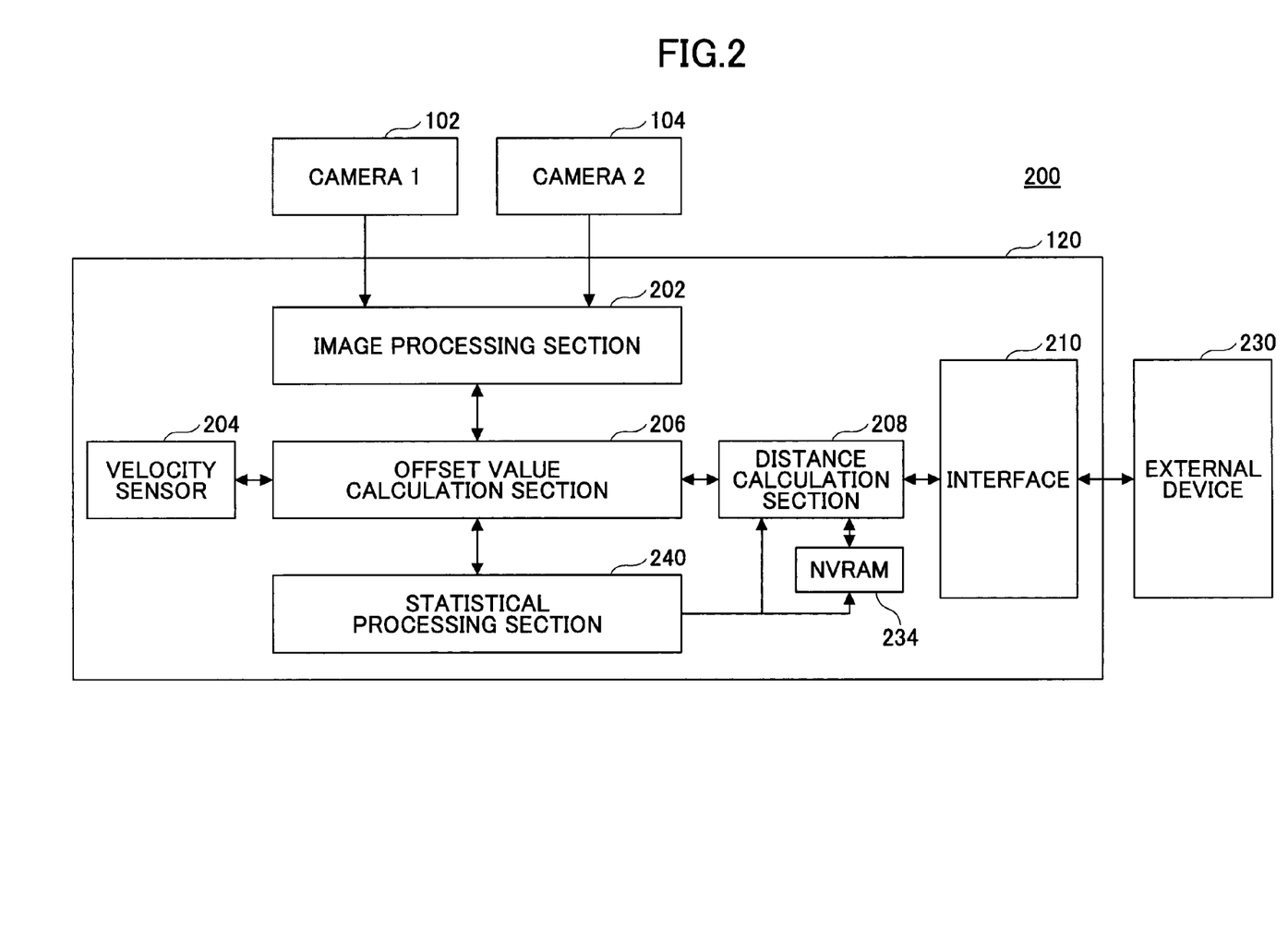
FIG. 2 a detailed functional block diagram 200 of the stereo camera device 100 according to the embodiment of the present invention.

The calculation section 120 performs a distance calculation based on the images output from the right and left cameras (i.e., cameras 102 and 104), and obtains (calculates) a distance Z from the optical center of the cameras 102 and 104 to a subject 108 (see FIG. 1). The calculation section 120 outputs the calculated distance Z to an external device 230 (see. FIG. 2) connected to the calculation section 120, so that the output device 230 can use the value of the distance Z. The stereo camera device 100 including the calculation section 120 performs the distance calculation, an offset value measurement, and a parameter correction by a controller (not shown) that performs I/O control between the stereo camera device 100 and a user interface and the external device 230.

The cameras 102 and 104 includes lenses 102a and 104a and photoelectric conversion elements 102a and 104b to obtain (acquire) right (R) and left (L) images, respectively. The cameras 102 and 104 are disposed in a manner such that the cameras 102 and 104 are separated from each other by a base line distance B between the centers of the lenses 102a and 104a and an optical axis 110 of the camera 102 is parallel to an optical axis 112 of the camera 104. The cameras 102 and 104 perform a photoelectric conversion on the optical images having passed through the lenses 102a and 104a and formed on the conversion elements 102a and 104b, respectively, by a shutter (not shown), and store the respective photoelectric converted images as digital data. The stored (recorded) images are output to the calculation section 120 to be used in the distance calculation and a correction process later.

As described above, the cameras 102 and 104 are disposed in a manner such that the cameras 102 and 104 are separated from each other by a base line distance B and the optical axis 110 is parallel to the optical axis 112. Further, the lenses 102a and 104a of the cameras 102 and 104 have the same focal point distance f. The distance Z from the optical centers and the subject 108 (in the direction parallel to the optical axes 110 and 112) is given in the following formula (1) by using a parallax p of the subject 108 in the right (R) and left (L) images of the subject 108 acquired by the right and left cameras 102 and 104. Herein, the parallax p is defined as a positional difference in the image of the subject 108 acquired by the cameras 102 and 104.

$$Z = B \times f / p \quad (1)$$

In order to accurately measure the distance Z, it is necessary that the optical axis 110 is accurately parallel to the optical axis 112. However, it may be difficult to maintain the parallel relationship between the optical axes 110 and 112 depending on a setting state of the cameras 102 and 104 during manufacturing and installation. To overcome the inconvenience, in many cases, in the distance calculation, the actual stereo camera device 100 uses the following formula (2) including a correction parameter q to accurately calculate the distance using the parameter mainly related to the parallelism (parallel relationship).

$$Z = B \times f / (p - q) \quad (2)$$

The parameter q in the formula (2) is the correction parameter referred to as a parallax offset. In this embodiment of the present invention, the correction parameter q is calculated in the method described below. Namely, a corresponding point k is determined on the images at different time points. Based on time difference or a running distance of the vehicle having the stereo camera device 100 of the corresponding point k, a parallax offset value $q_k$ relevant to the corresponding point k is obtained across the entire image. Then, a statistical process is performed on the parallax offset values $q_k$ and an optimum value of the parallax offset values $q_k$ of the image is determined as the correction parameter q. After a certain time period has passed since the installation of the stereo camera device 100, the parallelism (parallel relationship) between the cameras 102 and 104 may be impaired due to relative rotation between the cameras 102 and 104 caused by, for example, the vibrations of the vehicle in which the stereo camera device 100 is installed. FIG. 1 schematically illustrates a case where the camera 104 is slightly rotated relative to the camera 102 to a position (state) 106 over time. As a result, the parallelism (parallel relationship) between the optical axes 110 and 112 is impaired (degraded).

The same change over time may also occur in the camera 102 as well. Therefore, in a conventional stereo camera device, a method is employed in which a test chart having a predetermined distance is periodically read to calculate the parallax offset value; a previous correction parameter q is replaced by the calculated parallax offset value; and the replaced (updated) correction parameter q is stored in a non-volatile memory such as an NVRAM (Non-Volatile Random Access Memory) to be used for the distance calculation later. Further, when the stereo camera device includes a motor to correct the optical axes, the replaced (updated) correction parameter q may be used in control data to control the drive of the motor.

FIG. 2 is a function block diagram 200 of the stereo camera device 100 according to this embodiment of the present invention. As illustrated in FIG. 2, the stereo camera device 100 includes the cameras 102 and 104 and the calculation section 120.

The calculation section 120 instructs (causes) the cameras 102 and 104 to capture images, and performs a distance measurement calculation and calculation for parameter correction using the images acquired by the cameras 102 and 104.

The calculation section 120 may be implemented as a one-chip microcomputer, an ASIC (Application Specific Integrated Circuit), an in-vehicle computer, a personal computer or the like. Further, the calculation section 120 performs mutual communications with the external device 230 to output a result of the distance measurement calculation calculated by the calculation section 120 using the images to the external device 230, so that the external device 230 can perform various controls using the distance Z calculated by the calculation section 120. The external device 230 may not be included in the calculation section 120 that performs memory access with a CPU (Central Processing Unit), a RAM (Random Access Memory), a ROM (Read Only Memory), and other memory device such as a USB memory. Otherwise, the external device 230 may be integrated into the calculation section 120 as an information processing device.

As illustrated in FIG. 2, the calculation section 120 includes an image processing section 202, an offset value calculation section 206, a distance calculation section 208 and a statistical processing section 240. In the distance measurement calculation, the image processing section 202 performs an image analysis on the images acquired by the right (R) and left (L) cameras 102 and 104, and determines the corresponding point common to the images. Then the image processing section 202 determines the same pixel of the subject in the right and left images as the corresponding point, and calculates a parallax $p_k$ as the difference of the positional coordinates in the images with respect to the corresponding point. In this embodiment, it is necessary for the image processing section 202 to calculate the parallax across the entire image. To improve the accuracy in searching for the corresponding point in the captured image and calculating the parallax, a known distortion correction process (method) or the like may be used.

The calculated parallax $p_k$ is output to the offset value calculation section 206 and further output to the distance calculation section 208. At a timing to start a parameter correction process or upon a receipt of an external interruption signal to start the parameter correction process, the offset value calculation section 206 starts the parameter correction process. In the time period other than the time period of performing the parameter correction process, the offset value calculation section 206 performs the distance measurement using only the parallax $p_k$. The parameter correction process is executed by synchronizing the timings of a velocity sensor 204 to obtain velocity information and the cameras 102 and 104 to acquire images by the calculation section 120.

When the offset value calculation section 206 performs the distance measurement, the distance calculation section 208 receives the parallax $p_k$ that was received by the offset value calculation section 206, and calculates distance Z using the correction parameter q which is effective at that time and based on the formula (1). The calculated distance Z is output from the calculation section 120 to the external device 230 via an interface 210 included in the calculation section 120. By using the received distance Z, the external device 230 performs control to control other in-vehicle devices such as an alarm device, a control device, and an engine.

As described above, the calculation section 120 includes the statistical processing section 240. The statistical processing section 240 along with the offset value calculation section 206 and the velocity sensor 204 of FIG. 2 constitutes a parameter correction unit according to this embodiment of the present invention. The velocity sensor 204 detects the moving velocity of the vehicle on which the stereo camera device 100 is mounted. When the stereo camera device 100 is mounted on the vehicle, the velocity sensor 204 may be, for example, a vehicle velocity sensor or a GPS (Global Positioning System) device that calculates and outputs the velocity based on differences of latitude/longitude coordinates and time difference between time (time points) $t_0$ and $t_1$. Further, in another embodiment of the present invention, the velocity sensor 204 may be provided as an embedded device in the calculation section 120 of the stereo camera device 100.

Next, the specific parameter correction process according to this embodiment of the present invention is described. In the parameter correction process according to this embodiment of the present invention, first, the calculation section 120 instructs the cameras 102 and 104 to capture (acquire) images at time $t_0$ as a reference time and simultaneously instructs the velocity sensor 204 to output the velocity information.

At time $t_1$ when a predetermined time period has passed since time $t_0$, the calculation section 120 further instructs the cameras 102 and 104 to capture (acquire) images. As a result, the stereo camera device 100 acquires images captured by the two cameras 102 and 104 at time (time points) $t_0$ and $t_1$. Namely, the stereo camera device 100 acquires four images. Then, the image processing section 202 searches for the corresponding point based on two images of the respective cameras 102 and 104 at time $t_0$ and calculates a corresponding parallax image. In the same manner, the image processing section 202 searches for the corresponding point based on two images of the respective cameras 102 and 104 at time $t_1$ and calculates the corresponding parallax image. Those parallax images are input to the offset value calculation section 206. Further, to calculate (acquire) the corresponding points of the parallax images at time $t_0$ and $t_1$, not only the parallax images but also the images having been used for acquiring the parallax images are input to the offset value calculation section 206.

On the other hand, the calculation section 120 sets the velocity information output from the velocity sensor 204 into the offset value calculation section 206, and further sets parallax values $p_0$ and $p_1$ relevant to the corresponding points common to the respective sets of the two images captured by the two cameras 102 and 104. Herein, the parallax value $p_0$ refers to the parallax of the corresponding point k at time $t_0$. The parallax value $p_1$ refers to the parallax of the same corresponding point k at time $t_1$. In the following descriptions, for clarification purposes, it is assumed that the corresponding point has been fixed to the corresponding point k.

Based on the parallax values $p_0$ and $p_1$ acquired as described above, the offset value calculation section 206 obtains the following formula (3) expressing the relationships between the distances $Z_0$ and $Z_1$ at time $t_0$ and $t_1$ and the parallax value $p_0$ and $p_1$ at time $t_0$ and $t_1$.

$$Z_0 = Bf/\{p_0 - p_k\}$$

$$Z_1 = Bf/\{p_1 - q_k\} \quad (3)$$

When the subject of the corresponding point is a static subject, the distances $Z_0$ and $Z_1$ and the running distance D correspond to the moved distance. On the other hand, when the subject of the corresponding point is a moving subject such as a vehicle, the distances $Z_0$ and $Z_1$ and the running distance D correspond to a distance calculated based on the relative velocity. Further, when the subject of the corresponding point is a moving subject, the relative velocity corresponding to the camera 102 may differ from the relative velocity corresponding to the camera 104. In this case, the values of $Z_1$ distribute in a range having the center of $Z_0$.

By using the above formula (3), the running distance D is given as $D = Z_0 - Z_1$. Further, the running distance D is given as in the following formula (4) where the base line distance B, the focal point distance f, the parallax value of measurement variables $p_0$ and $p_1$, and the parallax offset value $q_k$ of the corresponding point k are used.

$$Z_0 - Z_1 = Bf/\{p_0 - q_k\} - Bf/\{p_1 - q_k\} \quad (4)$$

The above formula (4) may be transformed into a second degree equation of the parallax offset value $q_k$. Further, based on the formula (4), the parallax offset value $q_k$ is given in the following formula (5) as the solution ($q_k \geq 0$) of the second degree equation.

$$q_k = \frac{(p_0 + p_1) \pm \sqrt{(p_0 + p_1)^2 - 4\left(p_0 p_1 - \frac{Bf}{D}(p_1 - p_0)\right)}}{2} \quad (5)$$

As described above, the parallax offset value $q_k$ may vary depending on the relative velocity between moving bodies and may not be always the same. In this embodiment, the above relational formula is given for each of the corresponding points k (k=1 to N). Therefore, for each of the corresponding points k, the parallax offset values $q_k$ are calculated across the entire image as the candidates of the correction parameter q. The offset value calculation section 206 executes the process of the above formula (5).

Next, a statistical (correcting) process performed by the statistical processing section 240 is described. When the process of the offset value calculation section 206 is finished, the calculated parallax offset values $q_k$ are input to the statistical processing section 240. The statistical processing section 240 determines whether each of the calculated parallax offset values $q_k$ belongs to predetermined chunks (groups) one by one. In this case, when, for example, one parallax offset value $q_k$ is determined to belong to a specific chunk $Q_m$ (m: positive integer), the statistical processing section 240 increments the count value of the chunk $Q_m$ (by one). Further, the statistical processing section 240 counts the numbers of the parallax offset values $q_k$ for each of the chunks $Q_m$, and generates (calculates) the frequencies (appearance frequencies) $A_m$ of the parallax offset values $q_k$ of the corresponding chunks $Q_m$. Further, based on the frequencies (appearance frequencies) $A_m$ when the above counting process of all the corresponding points k is completed, the statistical processing section 240 generates a frequency matrix F of the following formula (6). Herein, the symbol $Q_m$ denotes chunks of the parallax offset values $q_k$ and is referred by the corresponding index values $I_m$ which is provided to give the correction parameter q and is the values defined as $I_m$=(minimum value)+$\Delta \times M$. Further, with respect to the chunk $Q_m$, the maximum value of the parallax offset value $q_k$ may be determined in advance, and a range up to the maximum value may be evenly divided into m sections, so that the above frequency accumulation calculation may be performed. In this embodiment, even when the parallax offset values $q_k$ cannot be acquired across the entire image, it may become possible to effectively determine the optimum value based on a comparison between the peak of the frequency distribution and the number of the remaining sample points. As a result, it may become possible to minimize (reduce) the time period when the stereo camera device 100 cannot measure the distance due to the statistical (correcting) process. Further, according to another embodiment of the present invention, the appearance frequencies may be calculated after the parallax offset value $q_k$ is calculated for all the pixels.

$$\begin{pmatrix} m \\ A_m \end{pmatrix} = \begin{pmatrix} 1, 2, 3, \ldots, (M-2), (M-1), M \\ A_1, A_2, A_3, \ldots, A_{M-2}, A_{M-1}, A_M \end{pmatrix} \quad (6)$$

The above frequency matrix F provides statistical data used to provide (determine) the correction parameter q. In this case, the statistical processing section 240 may use any of known statistical processings to perform a process on the statistical data to obtain the optimum value. Specifically, in the statistical processing, the mode value, the median value, the average value, the weighted average value or the like may be used. When the mode value is used, the parallax offset value $q_k$ may be determined as the index value $I_{max}$ providing the focal point distance $f_{max}$. In addition, the parallax offset value $q_k$ may be acquired (determined) by using the regression analysis assuming the normal distribution, the regression analysis assuming the polynomial distribution, the regression analysis using the distribution function such as the binomial distribution, the X square distribution, the Poisson distribution, the $\beta$ distribution or the like. Namely, any appropriate statistical model may be used.

In the statistical processing, when the dispersion is calculated and the calculated dispersion value occupies more than a predetermined rate relative to the deflection range of the parallax offset values $q_k$, the results so far may be discarded, so that, after a certain time period, the process may be re-executed. By doing this, it may become possible to avoid a case where an improper value is adopted as the correction parameter q. When a positional relationship between the two cameras 102 and 104 largely changes by a large impact, the change of the parallax offset value $q_k$ from the initial value should become larger, and the change of the parallax offset value $q_k$ over time or the like should become smaller. Therefore, the setting value of the deflection range of the parallax offset values $q_k$ varies depending on which type of the change is to be detected.

Further, in another embodiment of the present invention, when the statistical analysis assuming the standard deviation is performed, the standard deviation $\sigma_{past}$ when the currently effective correction parameter q is acquired may be stored, and whether the value is adopted may be determined based on the inspection result of the value acquired this time.

The following formula (7) has a format expressing the shifted angle (displacement angle) between the optical axes 110 and 112 of the cameras 102 and 104 by using the correction parameter q.

$$\theta = \tan^{-1}(q/f) \quad (7)$$

When the stereo camera device 100 includes a camera driving system, the data of the angle $\theta$ acquired based on the correction parameter q is transferred to the motor of the camera driving system as the data indicating the amount of driving the motor. On the other hand, when the stereo camera device 100 does not include the camera driving system, the data of the angle $\theta$ acquired based on the correction parameter q is transferred to the distance calculation section 208 and stored in an NVRAM 234 as the correction parameter q to be used for calculating the distance Z later. The data of the distance Z acquired by the distance calculation section 208 is output from the calculation section 120 to the external device 230 via the interface 210, so as to be used for various controls using the distance Z.

In this embodiment, the corresponding point k on the images captured (acquired) by the cameras 102 and 104 may be searched for by the pixel. Otherwise, from a viewpoint of faster processing, the right (R) and left (L) images may be divided into meshes, and the luminance, the hue, the color distribution and the like of the meshes may be calculated, so that the corresponding point is determined by the mesh.

Figure 3:
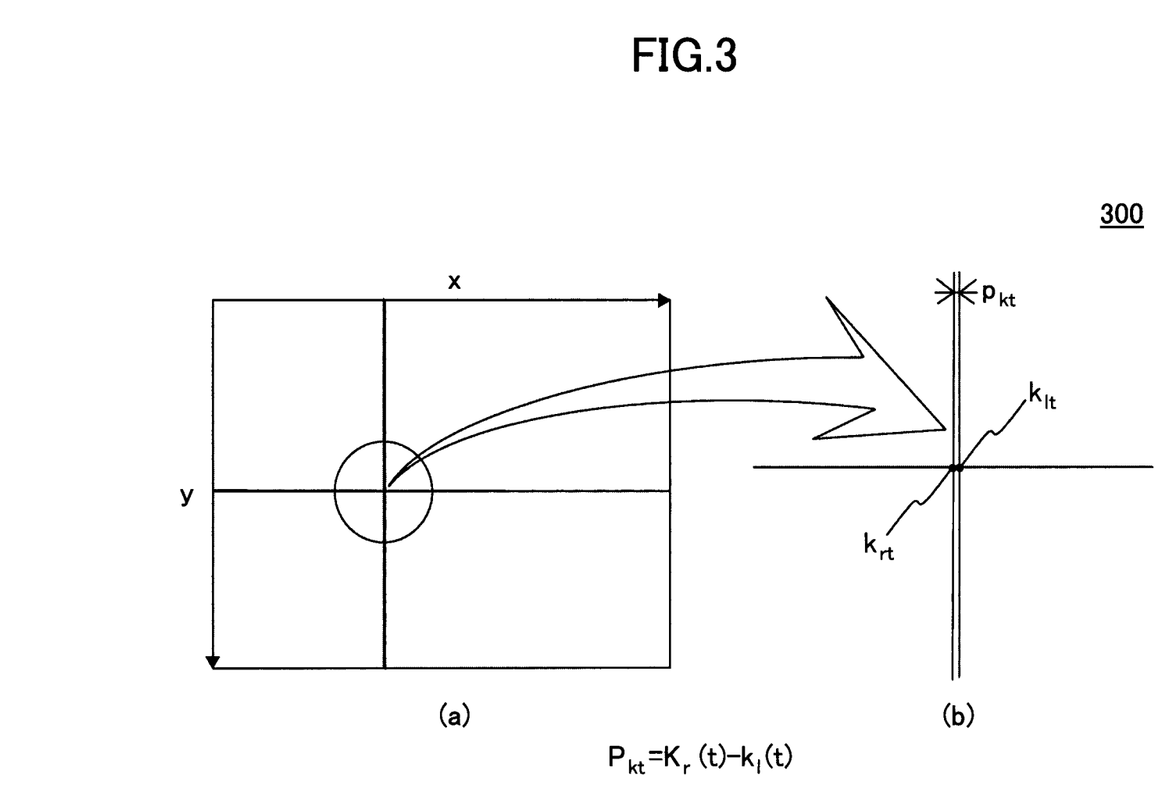
FIG. 3 is a drawing illustrating a relationship of a parallax $p_{k0}$ for a corresponding point $k_0$ according to the embodiment of the present invention.

FIG. 3 schematically illustrates relationships between a corresponding point $k_0$ and a parallax value $p_0$ used in this embodiment. After allocating meshes to the right (R) and left (L) images acquired by the right (R) and the left (L) cameras 102 and 104, the stereo camera device 100 searches for the corresponding point (mesh) of the right (R) and left (L) images. The search for the corresponding point of the right (R) and left (L) images may be performed by calculating and using the luminance, the hue, the color distribution and the like of the meshes. The right (R) and left (L) images do not largely differ from each other, though the change may depend on the base line length B. Because of this feature, in this embodiment, for example, when the corresponding point in the left (L) image is determined, the relevant corresponding point in the right (R) image may be searched for by searching only the surrounding several nearby meshes.

For explanatory purposes, a part (a) of FIG. 3 illustrates a state of the corresponding point. When the right (R) and left (L) images are superimposed to each other, a characteristic point of the right (R) image and the characteristic point of the left (L) image are within a range of several meshes. Further, in a case where the base line of the cameras 102 and 104 of the stereo camera device 100 is assumed to be horizontal, when the searching for the corresponding point is made in the shifted direction of the visual line when viewed from the side where the cameras are installed, the corresponding point may be effectively searched for (detected). However, the part (a) of FIG. 3 illustrates the parallax of the right (R) and left (L) images substantially in scale. Therefore, it is not clearly illustrated. The part (b) of FIG. 3 is an enlarged drawing illustrating the inside of the circle 300 of the part (a) of FIG. 3. As illustrated in the part (b) of FIG. 3, the corresponding points $k_{r0}$ and $k_{10}$ approach each other in the horizontal direction, and the positional shift between the corresponding points $k_{r0}$ and $k_{10}$ gives (corresponds to) the parallax $p_{k0}$. Further, the symbols $k_{r1}$ and $k_{11}$ denote the corresponding points at time $t_1$. Further, when the parallax of the corresponding point k at time t is expressed as $p_{kt}$, the following formula is satisfied.

$$p_{kt}=k_{rt}-k_{lt}$$

In embodiments, as described above, the parallax is calculated across the entire image. Therefore, to improve the accuracy in searching for the corresponding point in the captured images and in calculating the parallax, it is preferable to perform a known distortion correction process and the like.

Figure 4:
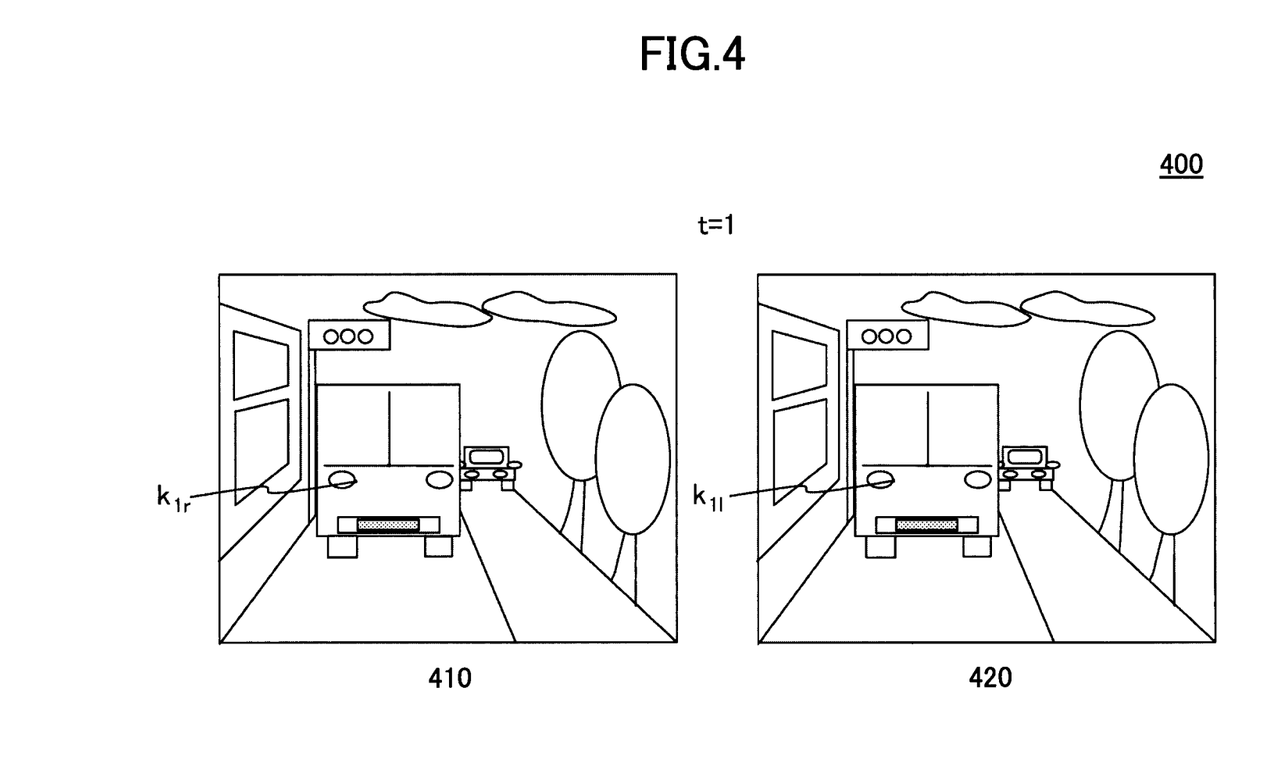
FIG. 4 are drawings illustrating right and left images acquired after an appropriate time interval has passed since time $t_0$.

FIG. 4 illustrates an example of right (R) and left (L) images acquired after an appropriate time period has passed since time $t_0$ according to an embodiment of the present invention. In response to the elapsed time, the positions of the subject changes in accordance with the difference in the relative velocity. However, in the example of FIG. 4, since the elapsed time period is so short that the right (R) and left (L) images 410 and 420 are substantially the same as the images at time of FIG. 3. It is preferable to determine an appropriate difference between time $t_0$ and time $t_1$ in a manner such that the corresponding point even near the edge part of the image can be detected. Namely, it is preferable to determine the appropriate difference so that the corresponding point can be successfully detected. However, when the difference between time $t_0$ and time $t_1$ is too long, the accuracy of detecting the corresponding point may be degraded. On the other hand, when the difference is too short, the parallax having sufficient difference may not be acquired. Therefore, it is preferable to determine the appropriate difference between time $t_0$ and time $t_1$ in a manner such that the difference of the parallax can be acquired based on the velocity by, for example, referring to the log data of the velocity sensor 204 and the searching for the corresponding point cannot be failed.

In this embodiment, as long as the same subject in the right (R) and left (L) images acquired in the same time point can be recognized, the position of the specific pixel of the subject in the image may be directly used. In another embodiment, after the image is divided into meshes, the data of the pixels in the same mesh may be averaged and the positional coordinates of the meshes may be used. In the following, it is assumed that the mesh and the pixels or the pixel region of the mesh may be referred to as the corresponding point which becomes a reference of the calculation in this embodiment.

In this embodiment, the size of the divided meshes is not limited to a specific size. However, when the size of the divided meshes is too small, it may take a longer time to search for the corresponding point which is the processing target in the right and left images. On the other hand, when the size of the divided meshes is too large, the accuracy of the correction may be degraded. In consideration of the above features, in this embodiment, for example, the image is divided into the meshes in a manner such that the number of the meshes in the vertical and the lateral directions is 100 and therefore the total number of the meshes in the images is 10,000.

Figure 5:
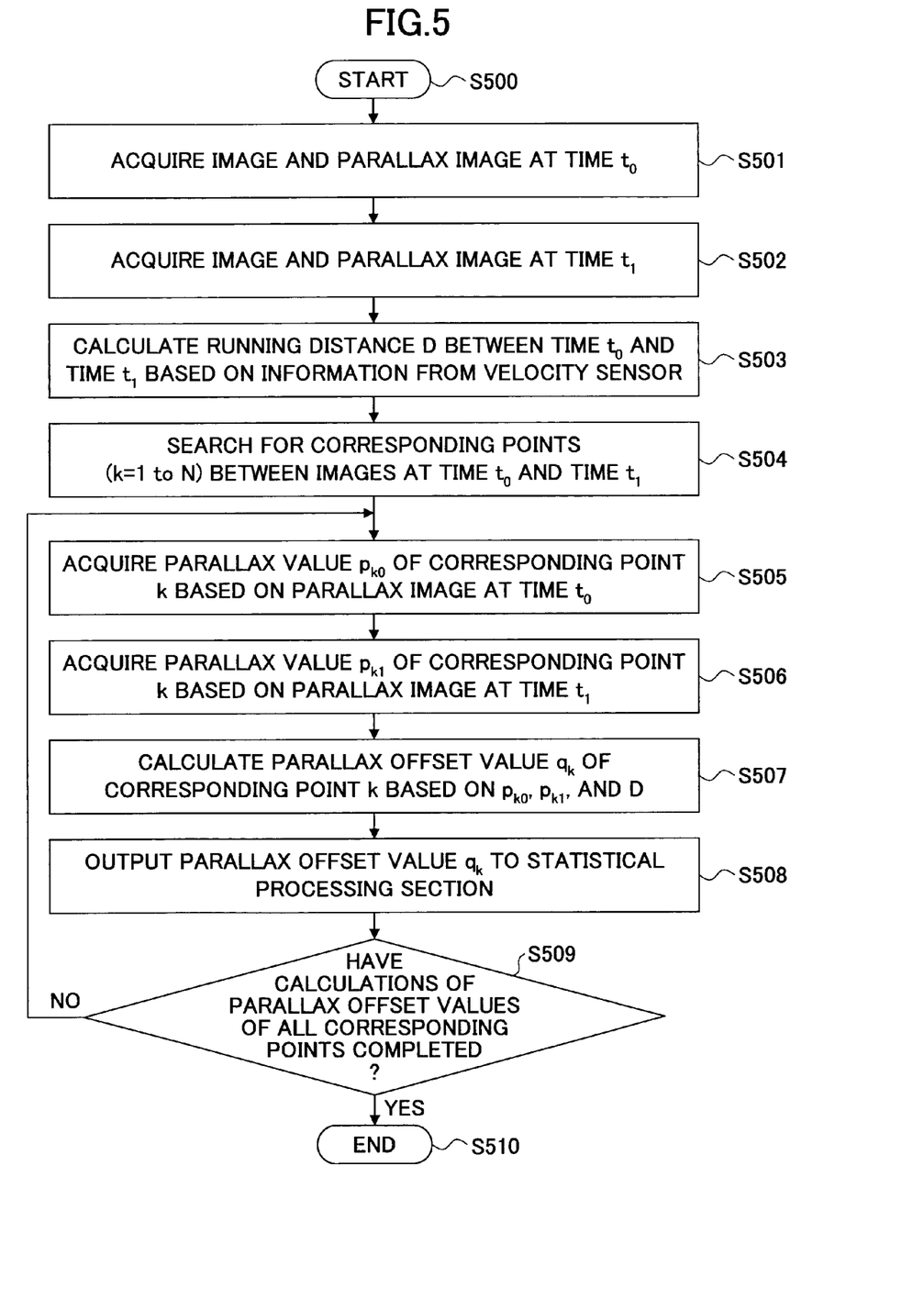
FIG. 5 is a detailed flowchart of a correction method according to an embodiment of the present invention.

FIG. 5 is a flowchart illustrating the process performed by the offset value calculation section 206 according to this embodiment of the present invention. As illustrated in FIG. 5, the process starts in step S500. In step S501, the offset value calculation section 206 receives the images and the corresponding parallax image at time $t_0$ from the image processing section 202. In step S502, the offset value calculation section 206 further receives the images and the corresponding parallax image at time $t_1$ from the image processing section 202. In step S503, the offset value calculation section 206 calculates the running distance D of the vehicle between time $t_0$ and time $t_1$ based on the information output from the velocity sensor 204. In step S504, the offset value calculation section 206 searches for the corresponding point on the different images at different time points based on the images acquired at time $t_1$ and time $t_0$.

In this case, the corresponding point is searched for by using the images captured by the two cameras 102 and 104 at time $t_1$ and time $t_0$ which is a time point when a predetermined time has passed since time $t_1$. However, more specifically, for example, the corresponding point may be searched for by using the images acquired only by one of the two cameras 102 and 104. Otherwise, the corresponding point may be searched for by using the images acquired by each of the two cameras 102 and 104. In searching for the corresponding point, a known technique such as the SAD (Sum of Absolute Difference) and the POC (Phase Only Correlation) may be used. Herein, the corresponding points of the images at different time points may be referred to as the corresponding points k (k=1 to N).

In steps S505 and S506, the offset value calculation section 206 calculates the parallax values of the corresponding points k of the images at different time points, the corresponding points k having been searched for in step S504. More specifically, in step S505, the offset value calculation section 206 acquires (calculates) the parallax value $p_{k0}$ related to the corresponding point k based on the parallax image at time $t_0$. In the same manner, in step S506, the offset value calculation section 206 acquires (calculates) the parallax value $p_{k1}$ related to the corresponding point k based on the parallax image at time $t_1$.

In step S507, the offset value calculation section 206 calculates the parallax offset value $q_k$ based on the formula (5) using the parallax value $p_{k0}$ related to the corresponding point k at time $t_0$, the parallax value $p_{k1}$ related to the corresponding point k at time $t_1$, and the running distance D of the vehicle between time $t_0$ and time $t_1$. However, as described above, there are plural corresponding points k across the entire image. Therefore, there are plural parallax values $p_{k0}$ and plural parallax values $p_{k1}$. On the other hand, there is only one value of the running distance D of the vehicle between time $t_0$ and time $t_1$. In step S508, the parallax offset value $q_k$ calculated in step S507 is output to the statistical processing section 240.

In step S509, the offset value calculation section 206 determines whether the calculations of the parallax offset values $q_k$ related to the plural corresponding points k across the entire image has been completed. When determining that the calculations has not been completed (NO in step S509), the process goes back to step S505 to repeat the calculations until the calculations of all the corresponding points k are completed. On the other hand, when determining that the calculations has been completed (YES in step S509), the process goes to step S510 to stop (finish) the process of the offset value calculation section 206. When the process is finished, the parallax offset values $q_k$ related to the plural corresponding points k across the entire image have been output to the statistical processing section 240.

Figure 6:
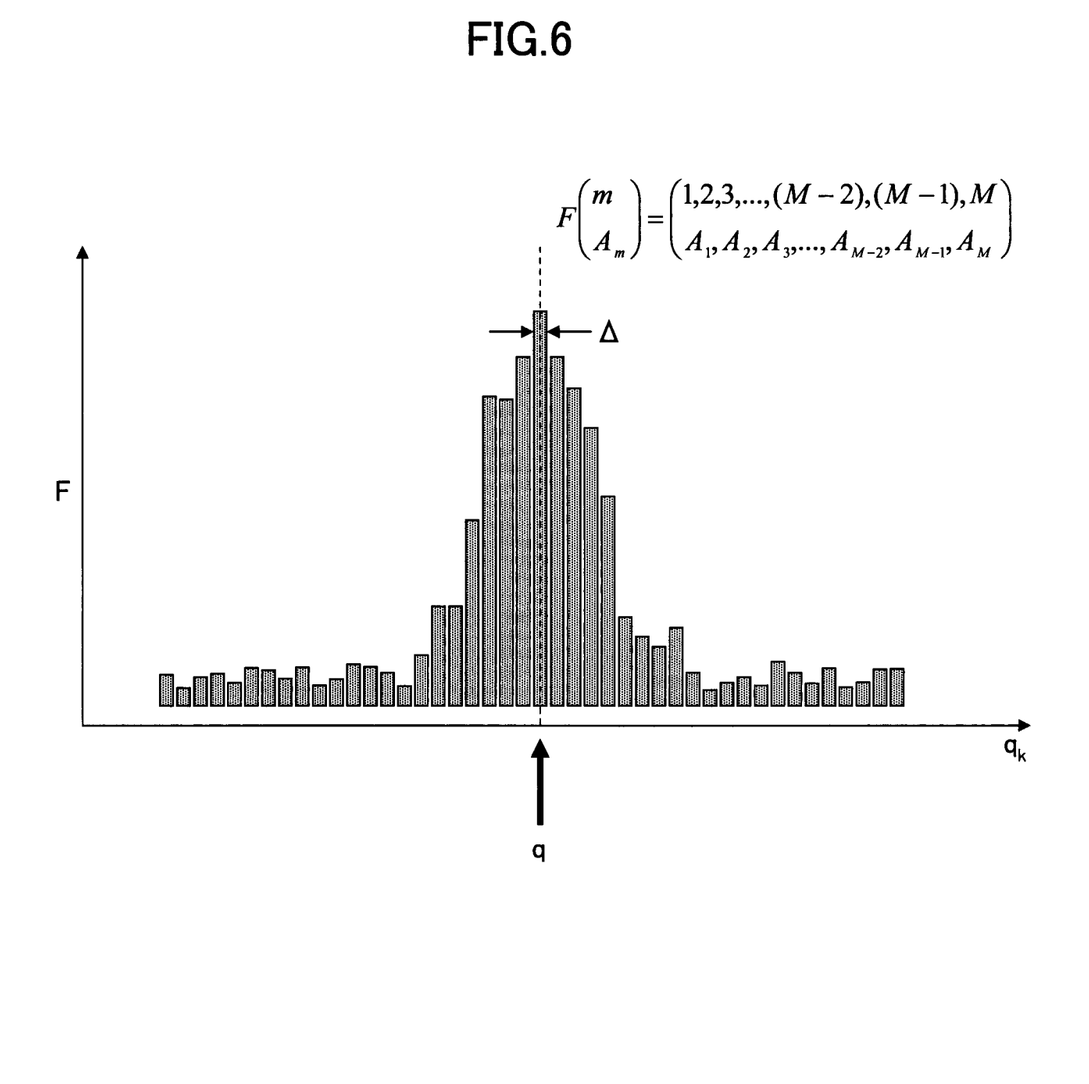
FIG. 6 is a graph illustrating a frequency matrix generated by the correction method in the embodiment in a range from the minimum value to the maximum value of the parallax offset values $q_k$, the graph having the lateral axis representing the parallax offset values and the vertical axis representing the frequency A.

FIG. 6 is a graph illustrating the frequency matrix F generated using a correction method according to this embodiment of the present invention. In the graph of FIG. 6, the lateral axis represents the parallax offset values $q_k$ in a range from the minimum value to the maximum value of the parallax offset values $q_k$, and the vertical axis represents the appearance frequencies A. In the embodiment of FIG. 6, the parallax offset values $q_k$ distributes in accordance with the relative velocities of the corresponding points k. The stereo camera device 100 performs the statistical processing on the parallax offset values $q_k$ calculated for each of the corresponding points k to form a histogram of the appearance frequencies A. In this example of FIG. 6, when determining that one parallax offset value $q_k$ corresponds to a specific chunk $Q_m$, the count value of the specific chunk $Q_m$ is incremented (accumulated) by one. This process is repeated until all the calculations of the corresponding points k are completed. When all the calculations of the corresponding points k are completed, the histogram having the chunks $Q_m$ having the index values $I_m$ and the width of Δ is formed. By performing a statistical analysis on the distribution illustrated in FIG. 6, the optimum value may be obtained as the correction parameter q. The correction parameter q may be determined by directly using the values of the index values $I_m$. Otherwise, when the weighted averaging or the like is applied, positive real numbers other than the index values $I_m$ may be used.

As another embodiment of the present invention, it is obvious that the optimum value may also be determined by collectively performing the statistical analysis on the n parallax offset values $q_k$ in the scattering diagram form without generating the frequency histogram. Namely, an appropriate statistical analysis may be selected based on, for example, the capability and the memory capacity of the calculation section 120.

As described above, according to an embodiment of the present invention, it may become possible to provide a stereo camera device, a correction method, and a program that highly-accurately corrects the parallax offset by maximally using the functions of the stereo camera device regardless of whether the subject is moving or not, regardless of the figure of the subject, regardless of time and place, and without necessarily accurately measuring the relative distances to the subject.

The above described functions in this embodiment may be realized by using a device-executable program that is described in a programming language such as C, C++, Java (registered trademark), or the like or an assembly language. Further, the program may be stored in and distributed using a device-readable recording medium such as a hard disk device, a CD-ROM (Compact Disk Read Only Memory), an MO (Magneto-Optical disk), a flexible disk, an EEPROM (Electrically Erasable Programmable Read Only Memory), an EPROM (Erasable Programmable Read Only Memory) or the like. Further, the program may be provided in a readable form by another device and may be transmitted via a network.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application Nos. 2010-205015 filed on Sep. 14, 2010, and 2011-121378 filed on May 31, 2011, the entire contents of which are hereby incorporated herein by reference.

The invention claimed is:

1. A stereo camera device detecting a distance to a moving subject, the stereo camera device comprising:
two cameras that are installed and separated from each other by a base line length on a moving platform; and
circuitry configured to calculate distances to the moving subject on images based on the images acquired by the two cameras;
wherein the circuitry is configured to search for corresponding points of the images acquired by the two cameras and to calculate two parallaxes, based on differences in positional coordinates of the corresponding points on the images, at least at two time points,
wherein the circuitry is configured to calculate a running distance, that is a difference between the distances to the moving subject at the two time points, based on relative velocities of the two cameras with respect to the moving subject,
wherein the circuitry is configured to calculate parallax offset values of the corresponding points across the images using the two parallaxes calculated by the circuitry at least at the two time points and using the calculated running distance, and
wherein the circuitry is configured to perform a statistical analysis on a distribution of the parallax offset values and determine an optimum value of the parallax offset values, the optimum value being used as a correction parameter.

2. The stereo camera device according to claim 1, wherein the circuitry is configured to generate a frequency distribution of the parallax offset values to determine the optimum value.

3. The stereo camera device according to claim 1, wherein the circuitry is configured to calculate a distance to the moving subject by using the correction parameter.

4. The stereo camera device according to claim 1, wherein the circuitry is configured to correct the correction parameter by using the optimum value of the parallax offset values, the correction parameter being used for measuring the distance.

5. The stereo camera device according to claim 1, wherein the circuitry includes a memory that writes data to a motor stage or an NVRAM.

6. A correction method performed by a stereo camera device that detects a distance to a moving subject, the method comprising:
acquiring images at different time points by synchronizing two cameras installed and separated from each other by a base line length on a moving platform;
calculating parallaxes based on differences in positional coordinates of corresponding points on the images acquired by the two cameras;
calculating a distance to a same corresponding point based on parallaxes of at least two images acquired at two different time points and by using the base line length, a focal point distance of the two cameras, and parallax offset values, the same corresponding point being on the two images;
calculating a running distance, that is a difference between distances to the moving subject at the two different time points, based on relative velocities of the two cameras with respect to the moving subject;
calculating the parallax offset values of the same corresponding point across the images using the running distance acquired at the two different time points and using the parallaxes of the two images;
determining an optimum value of the parallax offset values by performing a statistical analysis on a distribution of the parallax offset values; and
correcting a correction parameter by using the determined optimum value, the correction parameter being used for measuring the distance.

7. The correction method according to claim 6, further comprising:
   generating a frequency distribution of the parallax offset values to determine the optimum value.

8. A non-transitory computer-readable medium storing a computer-readable program that causes a computer to execute the correction method described in claim 6.

9. The stereo camera device according to claim 1, wherein the circuitry is configured to calculate the parallax offset values for all pixels of the images.

10. The correction method according to claim 6, wherein the calculating the parallax offset values includes calculating the parallax offset values for all pixels of the images.

11. The stereo camera device according to claim 1, wherein the circuitry is configured to calculate the parallax offset values for the corresponding points across a plurality of sections of the images.

12. The correction method according to claim 6, wherein the calculating the parallax offset values includes calculating the parallax offset values for the corresponding points across a plurality of sections of the images.

\* \* \* \* \*